(12) United States Patent
Burton

(10) Patent No.: US 8,684,574 B2
(45) Date of Patent: Apr. 1, 2014

(54) GEAR SCREW ADJUSTER

(75) Inventor: John Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 612 days.

(21) Appl. No.: 12/744,907

(22) PCT Filed: Dec. 10, 2008

(86) PCT No.: PCT/US2008/086222
§ 371 (c)(1),
(2), (4) Date: Oct. 22, 2010

(87) PCT Pub. No.: WO2009/076438
PCT Pub. Date: Jun. 18, 2009

(65) Prior Publication Data
US 2011/0032716 A1    Feb. 10, 2011

Related U.S. Application Data

(60) Provisional application No. 61/013,439, filed on Dec. 13, 2007.

(51) Int. Cl.
*B60Q 1/068* (2006.01)
(52) U.S. Cl.
USPC ............ 362/514; 362/460; 362/282; 362/524
(58) Field of Classification Search
USPC .......... 362/460, 514, 282, 284, 322, 324, 524
See application file for complete search history.

(56) References Cited

U.S. PATENT DOCUMENTS

| | | | |
|---|---|---|---|
| 4,503,486 A | 3/1985 | Makita | |
| 5,214,971 A | 6/1993 | Burton | |
| 5,546,283 A * | 8/1996 | Ohtsuka et al. | 362/528 |
| 5,678,915 A * | 10/1997 | Shirai et al. | 362/460 |
| 5,707,133 A | 1/1998 | Burton | |
| 5,746,559 A | 5/1998 | Shirai | |
| 6,527,427 B1 * | 3/2003 | Schroder | 362/524 |
| 6,910,789 B2 * | 6/2005 | Tanaka et al. | 362/514 |
| 7,052,164 B2 | 5/2006 | Burton | |
| 7,198,392 B2 * | 4/2007 | Hobbs et al. | |
| 7,284,887 B2 * | 10/2007 | Fladhammer | 362/515 |
| 7,824,087 B2 * | 11/2010 | Gattone et al. | |
| 2001/0030875 A1 | 10/2001 | Denley | |
| 2004/0090792 A1 | 5/2004 | Burton | |

OTHER PUBLICATIONS

Written opinion of the International Searching Authority in PCT/US2008/086222; mailed Feb. 12, 2009.

* cited by examiner

*Primary Examiner* — Peggy A. Neils
(74) *Attorney, Agent, or Firm* — Shane Delsman; Brian G. Gilpin; Godfrey & Kahn, S.C.

(57) ABSTRACT

A headlamp assembly includes a simplified adjusting mechanism for adjusting the aim of a headlamp. The mechanism includes a gear screw that is snap fit into the headlamp housing, a grommet that positioned around the gear screw and snap-fit into the headlamp reflector, and an O-ring to ensure a good seal.

4 Claims, 13 Drawing Sheets

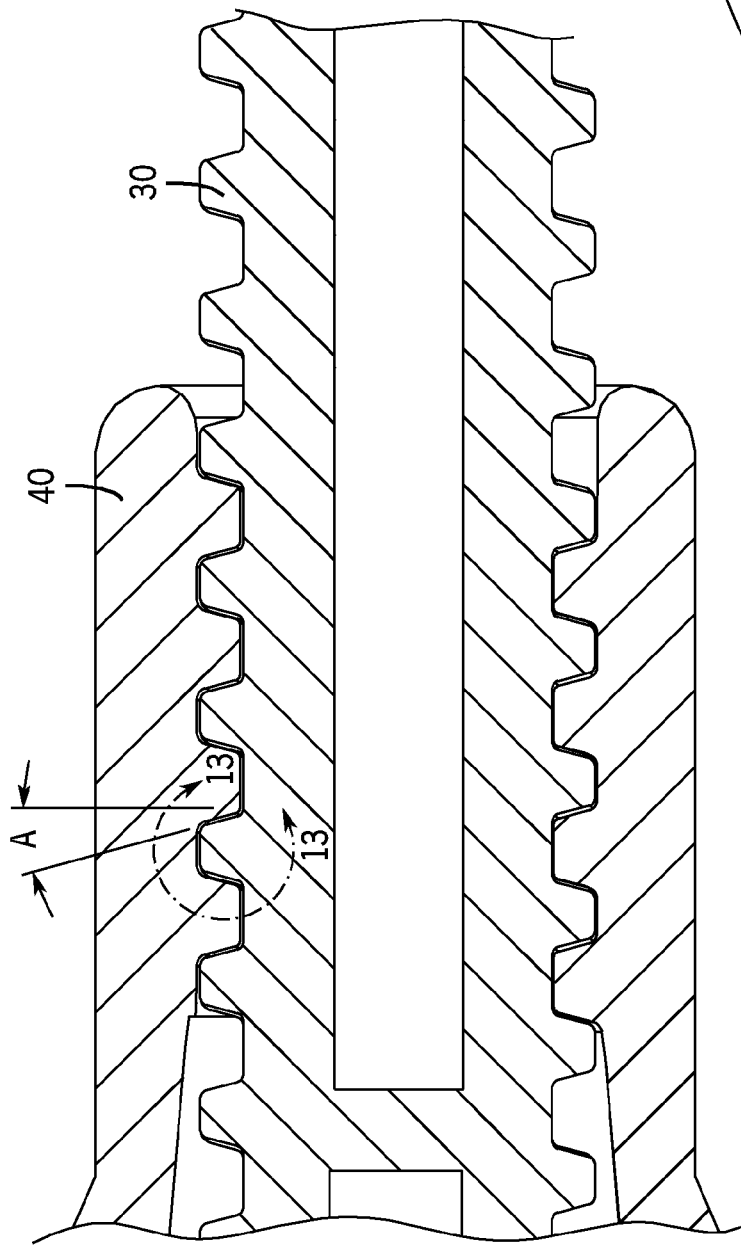
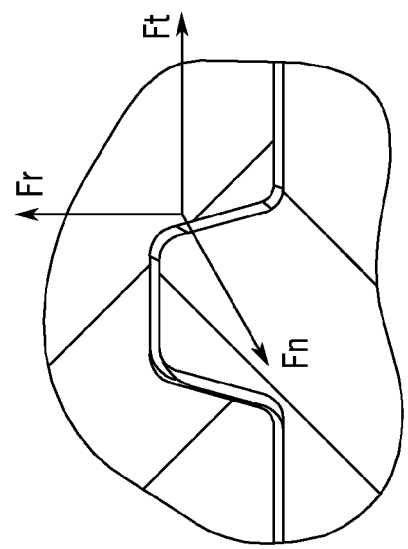
FIG. 13
FIG. 14

GEAR SCREW ADJUSTER

CROSS REFERENCE TO RELATED APPLICATIONS

This application claims the benefit of provisional U.S. Application No. 61/013,439, filed Dec. 13, 2007, which is incorporated herein by reference under 35 U.S.C. §119(e).

BACKGROUND OF THE INVENTION

As the design of vehicles and automobiles has evolved, headlights have continually been reconfigured to improve the aerodynamics of the front end of the vehicle. Modern headlights are designed so that their lenses follow the contour of the vehicle to provide an aerodynamically efficient exterior surface. However, adjustment of these headlights must still be performed in order to provide an optimal beam of light and to prevent the aiming of lights beams toward oncoming vehicles. Automotive manufacturers' demand for aerodynamically efficient headlight designs has lead to modular designs requiring the headlight adjustment mechanism to be located within the engine compartment so that the adjustment can be easily performed without removing any exterior trim pieces. Thus, the constraints of the installation area and the demands of the automobile manufacturers for aerodynamic headlight designs make it desirable to provide an adjuster for use with the aerodynamic designs that is adjustable from inside the engine compartment using ordinary tools, and translates rotational motion of the adjusting part into adjustment of the reflector within the headlight assembly. There are a wide variety of prior art adjuster devices including, among others, the devices disclosed in U.S. Pat. Nos. 5,707,133 and 5,214,971 to Burton, the inventor of the present invention, the disclosures of which are incorporated herein by reference.

Automotive lamp assemblies used as headlights typically comprise several basic parts: a support frame, a reflector, a lens, a bulb, and one or more adjusters. The support frame usually houses the reflector and the bulb on a pivotable mounting to allow the aim of the light to be adjusted using the adjuster. The lens seals the front of the assembly to protect it from the elements assailing the front end of the vehicle and provides and aerodynamic shape and attractive appearance. Traditionally, fixed and movable ball joints have engaged the headlamp reflector. Actuating the moveable ball joint results in altering the angle of the headlamp reflector by pivoting the reflector about the fixed ball joints. In certain variations, two movable ball joints are used to enable vertical and horizontal aiming of the headlamp.

In some instances, an aiming screw or gear screw replaces the moveable ball joint. With the screw assembly, the reflector mounts inside the housing on a gear screw assembly and is adjustable horizontally and/or vertically using adjusters that interface with the reflector by moving the gear screw. One such assembly is disclosed in U.S. Pat. No. 7,052,164 to Burton, which is incorporated herein by reference. A self-locking nut or grommet can also be incorporated into a gear screw adjuster to provide movability in both horizontal and vertical directions. A self-locking nut providing such movement is disclosed in U.S. Pat. No. 4,503,486 to Makita. As shown in FIG. 3 of the Makita patent, the self-locking nut is freely rockable in the direction shown by the arrow $P_3$ for the horizontal adjustment of the optical axis. However, the adjuster of Makita requires multiple steps for assembly into the headlamp housing, where the self-locking nut must be mounted to the reflector bracket and the adjusting rod then threaded into the nut.

Accordingly, the need exists for a compact gear screw adjuster assembly that can be securely retained in a wall or other structure of the headlamp housing, allows for easy installation and adjustment of the headlamp in multiple directions through use of a multi-function grommet, reduces the sealing problems associated with facially sealing O-rings, provides a clutching feature to prevent system damage due to over-travel, and is more efficient and cost effective to manufacture and to assemble to the headlamp housing.

SUMMARY OF THE INVENTION

The present invention provides a gear screw adjuster assembly that is cost-effective, easily installed in the lamp where it is securely retained, provides an improved seal and reduces torque screw variation, allows for adjustment in multiple directions with the use of a simple and inexpensive component that also provides a clutching feature, and which solves the problems raised or not solved by existing designs. In one embodiment an O-ring creates a complete radial seal between the neck of the gear screw and the O-ring, providing improved torque control and a robust air-tight seal.

In a preferred embodiment, the adjuster snap fits into both the headlamp housing and reflector in one step. The gear screw is snap fit into the opening of the housing and held securely in place by a retaining clip attached to the gear screw. The retaining clip fits through the opening, is compressed, and then "pops" open to secure the gear screw to the housing. A grommet on the gear screw engages the reflector by inserting a narrow front end through the opening, the opening then compressing the back end having a larger diameter, and the grommet then "popping" into place when the walls of the opening reach channels on the grommet into which the walls fit.

The grommet may provide multiple functions in addition to engaging the reflector. It can also provide for movement in multiple directions, including angular pivoting of the reflector and side-to-side movement by movement of the grommet within the reflector opening. The grommet may also provide a clutching feature, whereby the gear screw will "clutch," or disengage to stop movement of the reflector, when reaching a certain point on the threads of the gear screw to prevent over-travel and damage to the assembly.

While one possible application of the present invention is in headlamp assemblies, many other applications are possible and references to use in a headlamp assembly should not be deemed to limit the uses of the present invention. The terms "housing," "gear screw," "threading" or "teeth" as used herein should not be interpreted as being limited to specific forms or shapes of screws, threading thereon, or teeth. Rather, the housing, gear screw, threading, and teeth of the gear screw assembly in accordance with the present invention may have a wide variety of shapes. These and other objects and advantages of the present invention will become apparent from the detailed description and accompanying drawings.

BRIEF DESCRIPTION OF THE DRAWINGS

FIG. 13 is a cross-sectional view of a gear screw adjuster in a grommet in accordance with one embodiment of the present invention; and FIG. 14 is an enlarged cross-sectional view of the gear screw adjuster in the grommet of FIG. 13 taken along the lines 13-13.

DETAILED DESCRIPTION

Figure 1:
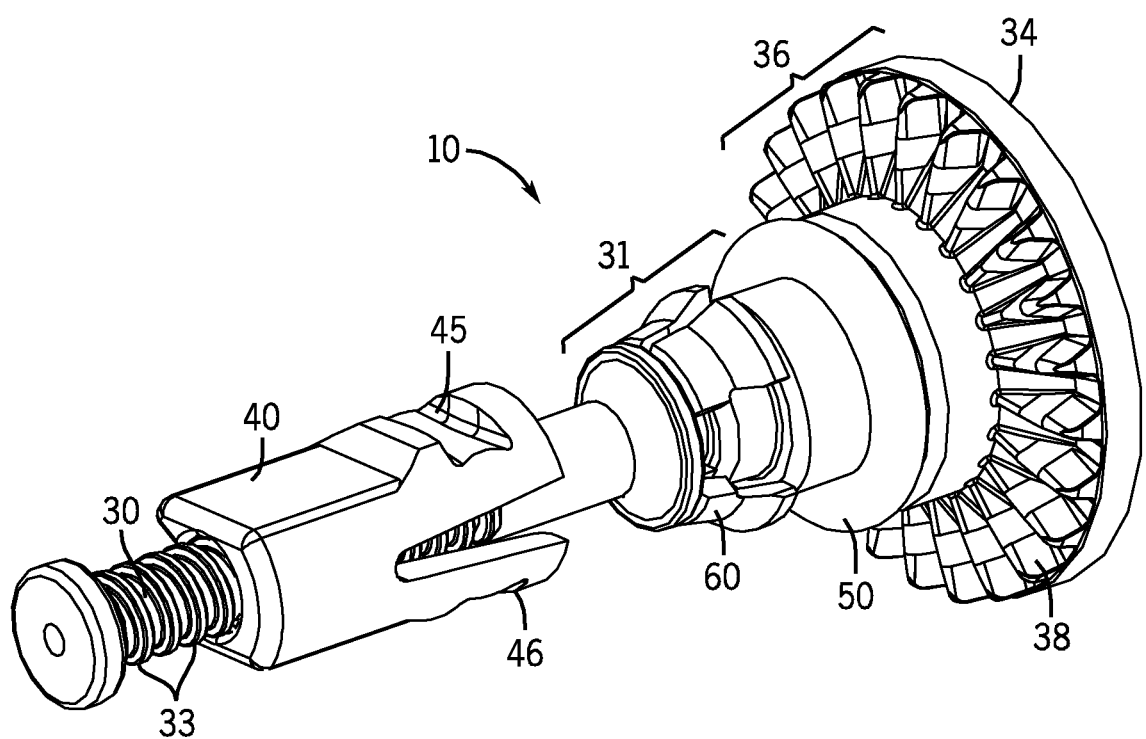
FIG. 1 is a side perspective view of a gear screw adjuster in accordance with one embodiment of the present invention.
Figure 2:
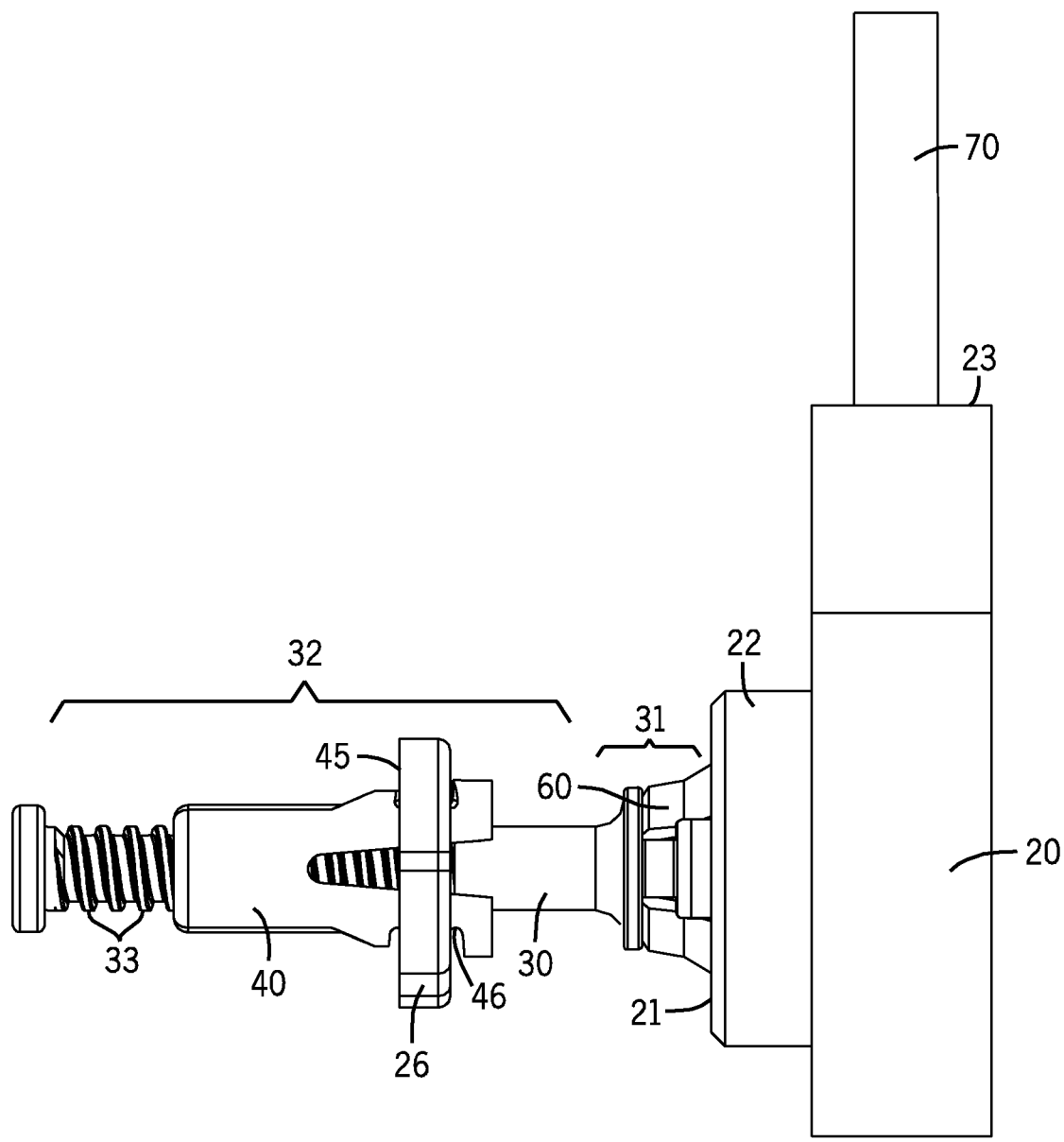
FIG. 2 is a side view of a gear screw adjuster installed into a headlamp assembly mounting and reflector in accordance with one embodiment of the present invention.
Figure 3:
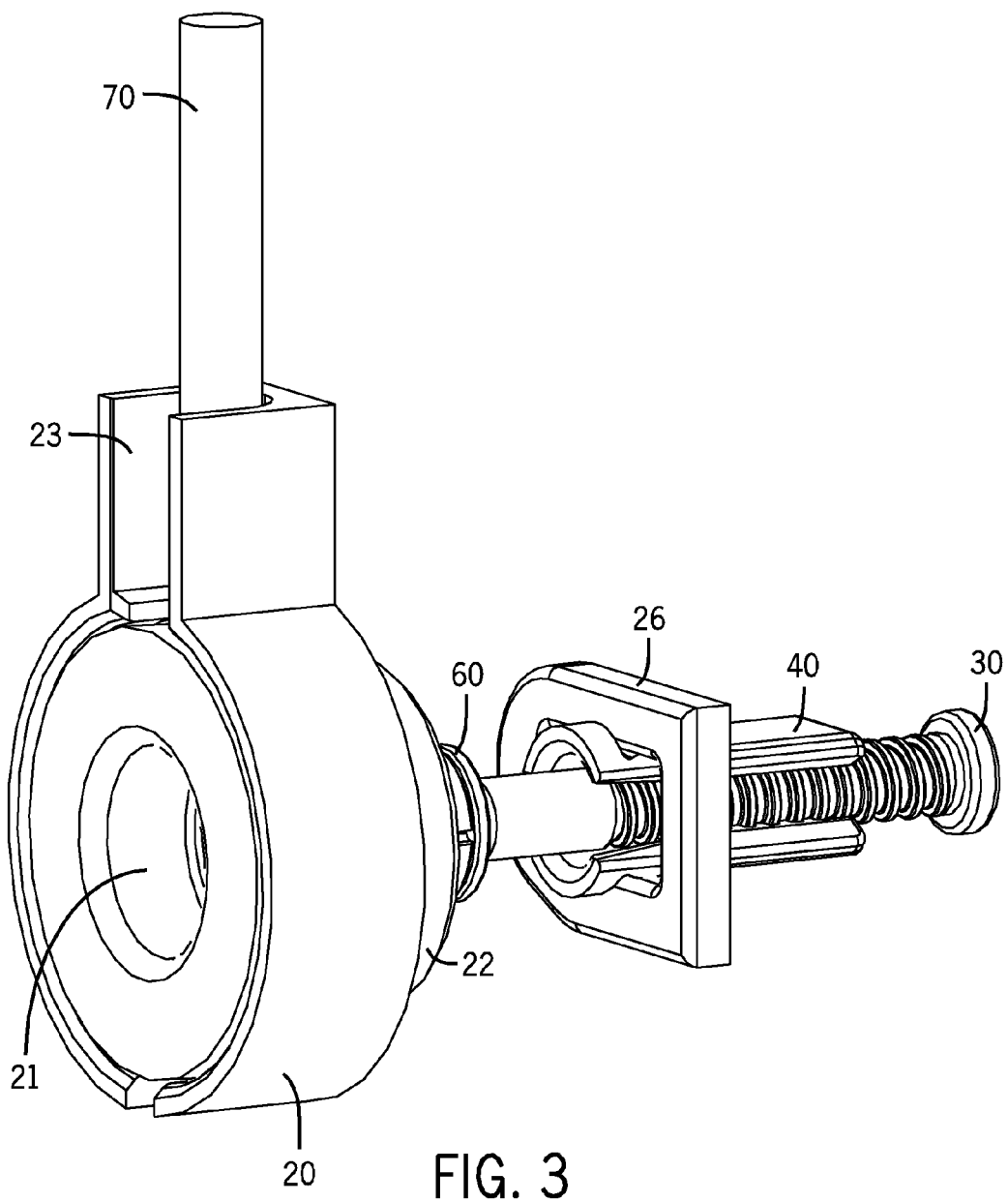
FIG. 3 is a rear perspective view of the gear screw adjuster assembly of FIG. 2.

One embodiment of a gear screw adjuster assembly 10 in accordance with the present invention are shown in FIGS. 1 through 13. While the invention may be susceptible to embodiment in different forms, there is shown in the drawings, and herein will be described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

FIG. 1 shows a gear screw adjuster 10. The adjuster 10 is used to adjust the aim of a reflector within a headlamp assembly. The headlamp assembly comprises many parts, including but not limited to, a housing 20, a movable reflector 26, a lens (not shown), and the requisite lamp and wiring (not shown). The adjuster 10 is used to adjust the movable reflector 26. The adjuster 10 is assembled and inserted through a stationary component of the headlamp assembly, such as the housing 20 or a separate mounting chamber, and is engaged with the reflector 26.

The adjuster 10 may include an adjusting or gear screw 30, an O-ring 50, a retaining clip 60 for securely holding the gear screw 30 to the housing 20, and a multi-function grommet 40. The adjuster 10 is shown in detail in FIGS. 1, 4 and 5. The gear screw 30 may be made of a plastic material by appropriate manufacturing methods such as molding or casting. Alternatively, the gear screw 30 may be made of metal material by appropriate manufacturing methods.

Figure 4:
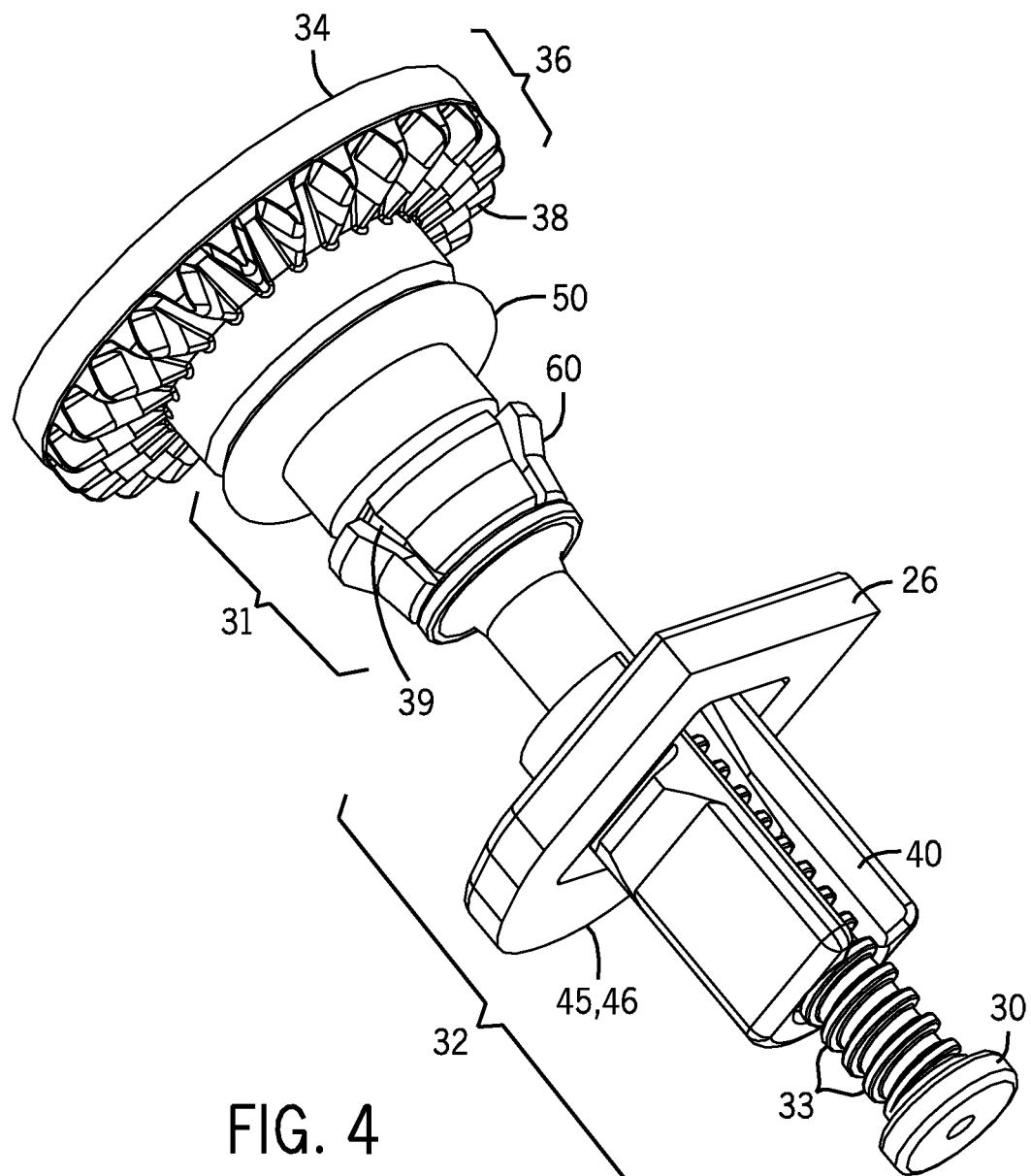
FIG. 4 is a side perspective view of a gear screw adjuster installed in a reflector in accordance with one embodiment of the present invention.
Figure 5:
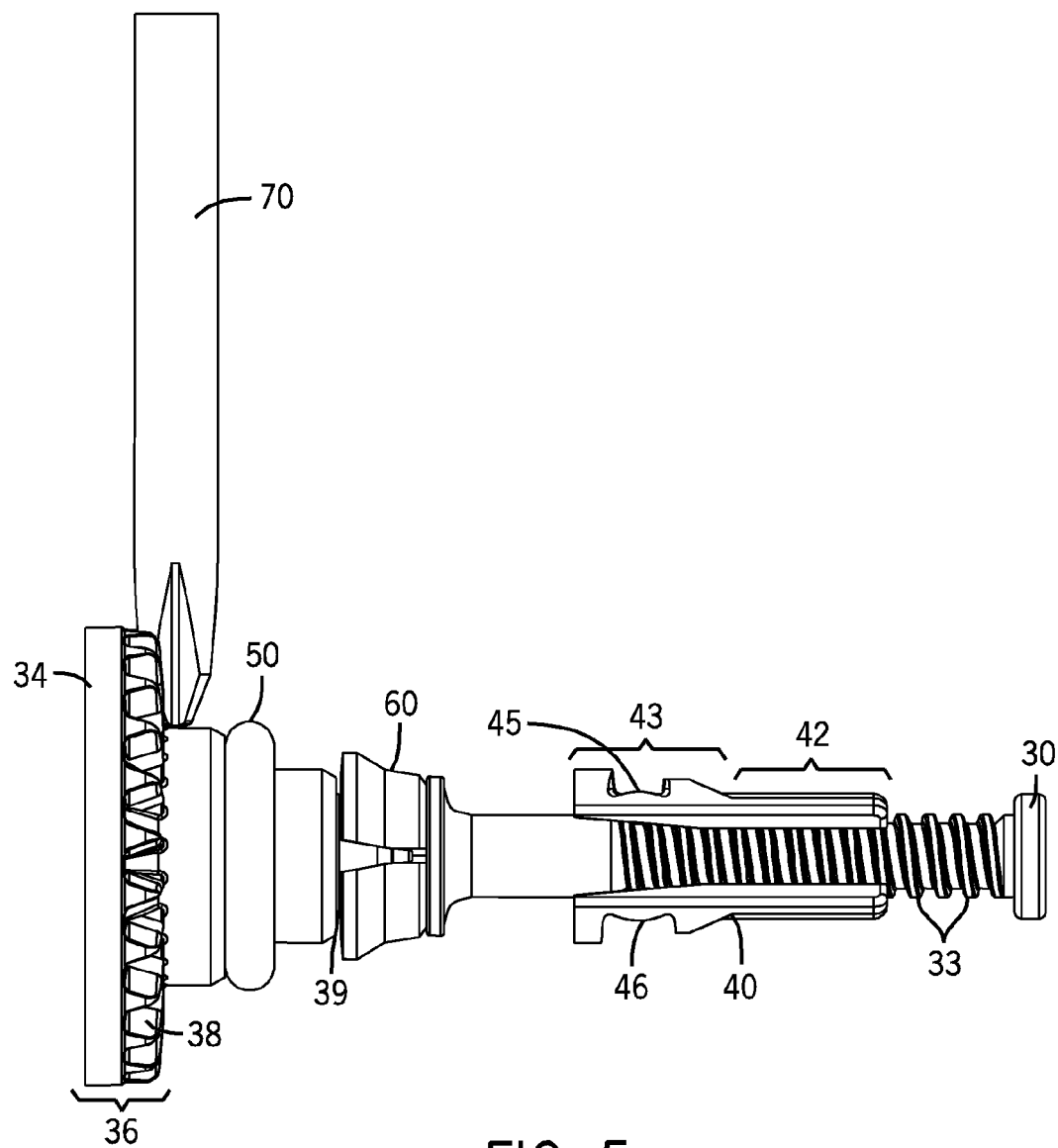
FIG. 5 is a side view of a gear screw adjuster and a driver in accordance with one embodiment of the present invention.
Figure 6:
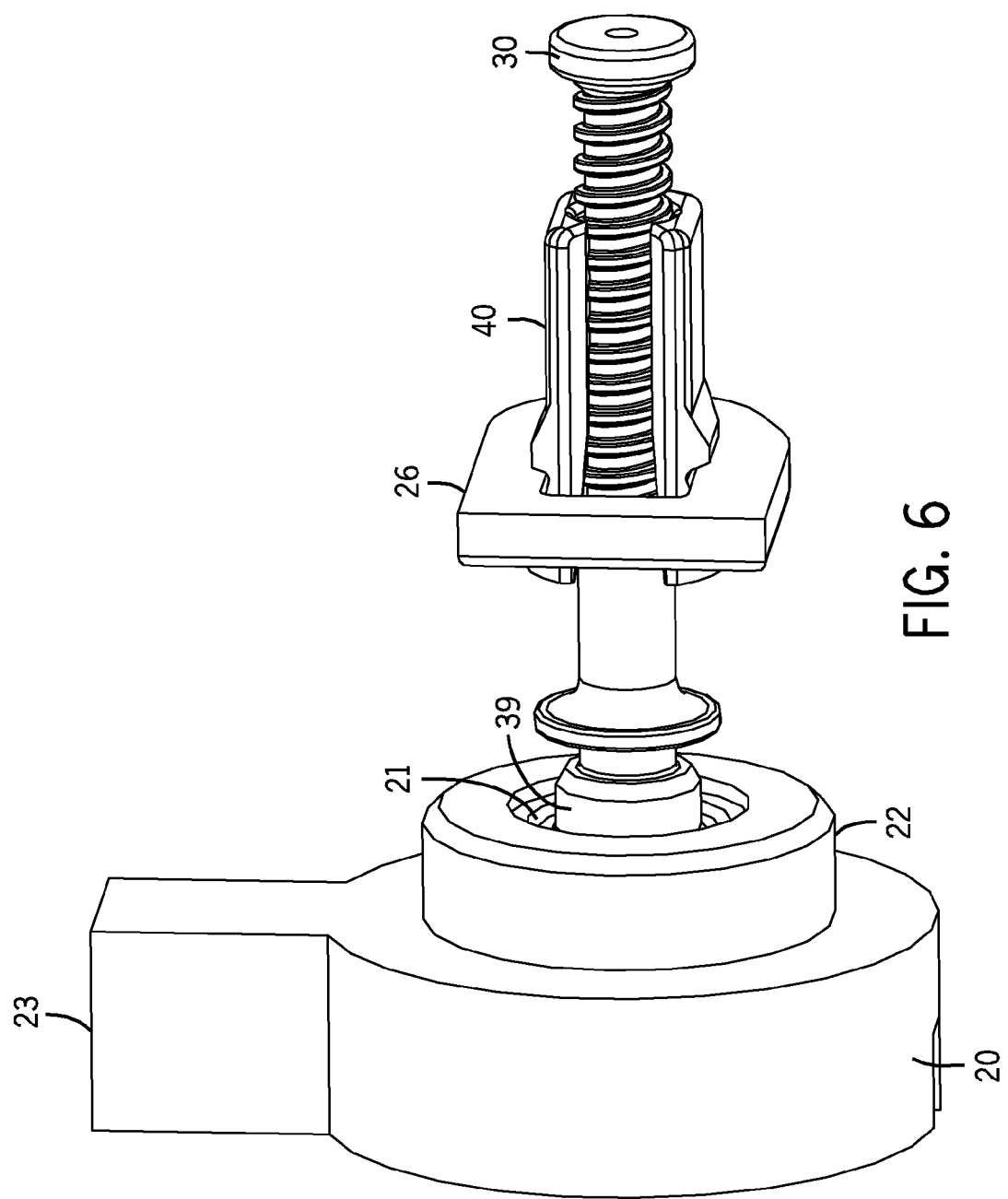
FIG. 6 is a side perspective view of a gear screw adjuster installed into a headlamp assembly mounting and reflector in accordance with one embodiment of the present invention.
Figure 7:
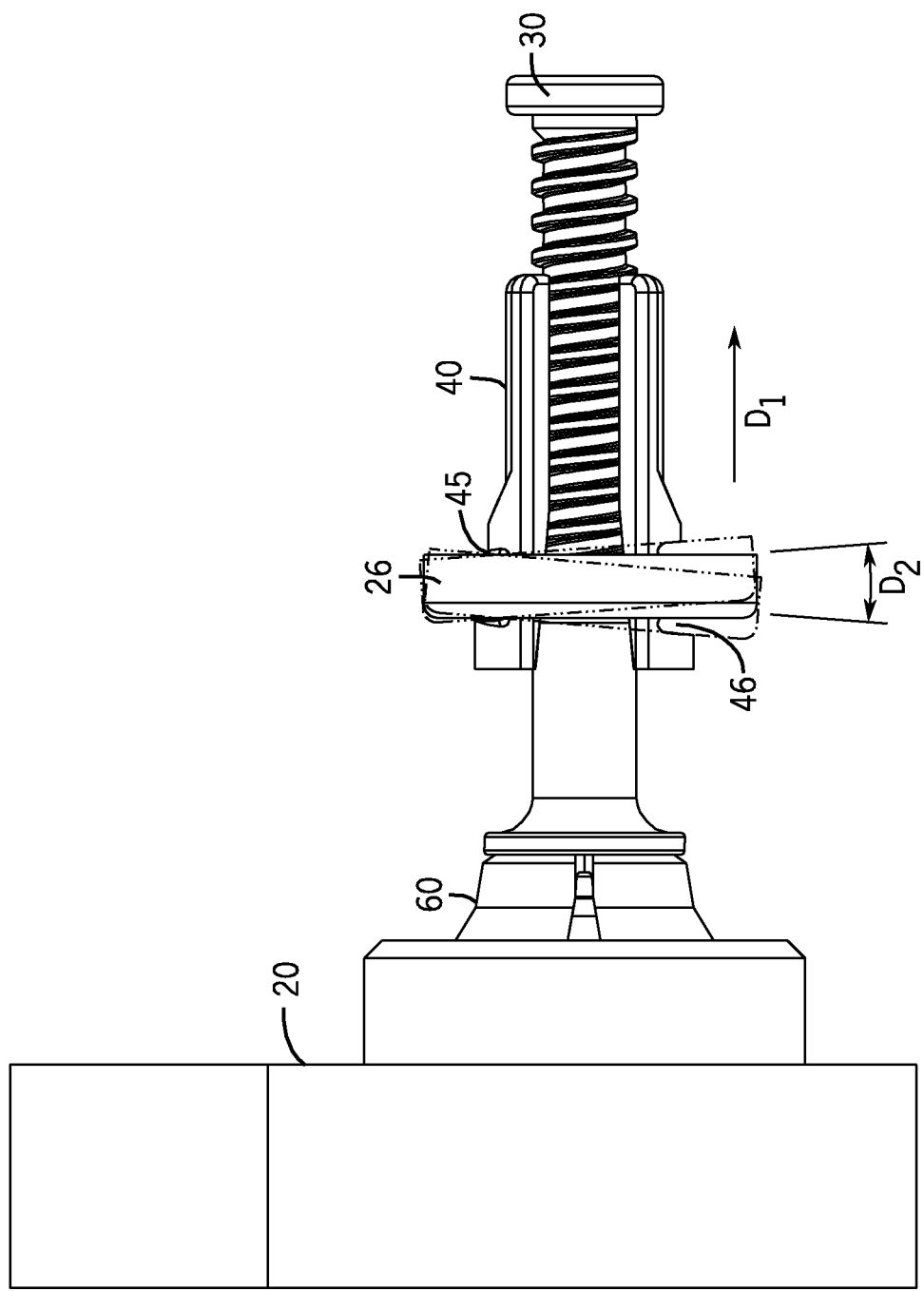
FIG. 7 is a side view of a gear screw adjuster installed into a headlamp assembly mounting and reflector in accordance with one embodiment of the present invention.

As shown in FIGS. 1, 4 and 5, the gear screw 30 provides space for an O-ring 50 along its neck 31. The neck 31 may have an O-ring groove (not shown) in which the O-ring 50 is located. This configuration maintains the position of the O-ring 50 as the gear screw 50 is snap-fit into the housing 20.

The O-ring 50 remains in the groove while the screw 30 travels through the housing 20 and while the screw 30 is rotated. The O-ring 50 functions to create a radial seal in the collar 22 of the housing 20 in which the gear screw 30 is positioned. The collar 22 has an interior diameter so that the collar 22 exerts a radial force along the outer diameter of the O-ring 50 once the gear screw 30 has been snap-fit and secured in the housing 20. This force creates a radial compression of the O-ring 50. As such, a complete radial seal is created between the neck 31 of the gear screw 30 and the O-ring 50, providing improved torque control and a robust air-tight seal.

There are several methods that have been found effective for securing the gear screw 30 in the collar 22. One such method that that shown in the FIGS. 2, 3, 7, and 9, but other methods may be used. This method uses a retaining clip 60 which, like the O-ring 50, is positioned in a clip groove 39 located in the neck 31 of the screw 30 (See FIG. 6). As the screw 30 is pushed into the housing collar 22, the retaining clip 60 is compressed into the clip groove 39. The interior diameter of the housing collar 22 is angled so the clip 60 contacts the interior diameter as the gear screw 30 is inserted into the housing collar 22. As the gear screw 30 passes through the housing collar 22, the interior diameter of the collar 22 compresses the retaining clip 60 into the clip groove 39. The interior diameter of the collar 22 provides sufficient space to allow the retaining clip 60 to expand once the gear screw 30 is inserted into the collar 22 in the correct position. As such, the retaining clip 60 "pops" open once the gear screw 30 reaches the correct position and "snap-fits" the gear screw 30 into place. Snap fitting the gear screw 30 into the headlamp housing 20 provides an easy way to ensure the gear screw 30 is properly and securely positioned in the headlamp housing 20. However, the gear screw 30 may be fit into the headlamp housing 20 by other effective means. The retaining clip 60 may be made of plastic, metal, or other material, but plastic has been found effective.

Figure 11:
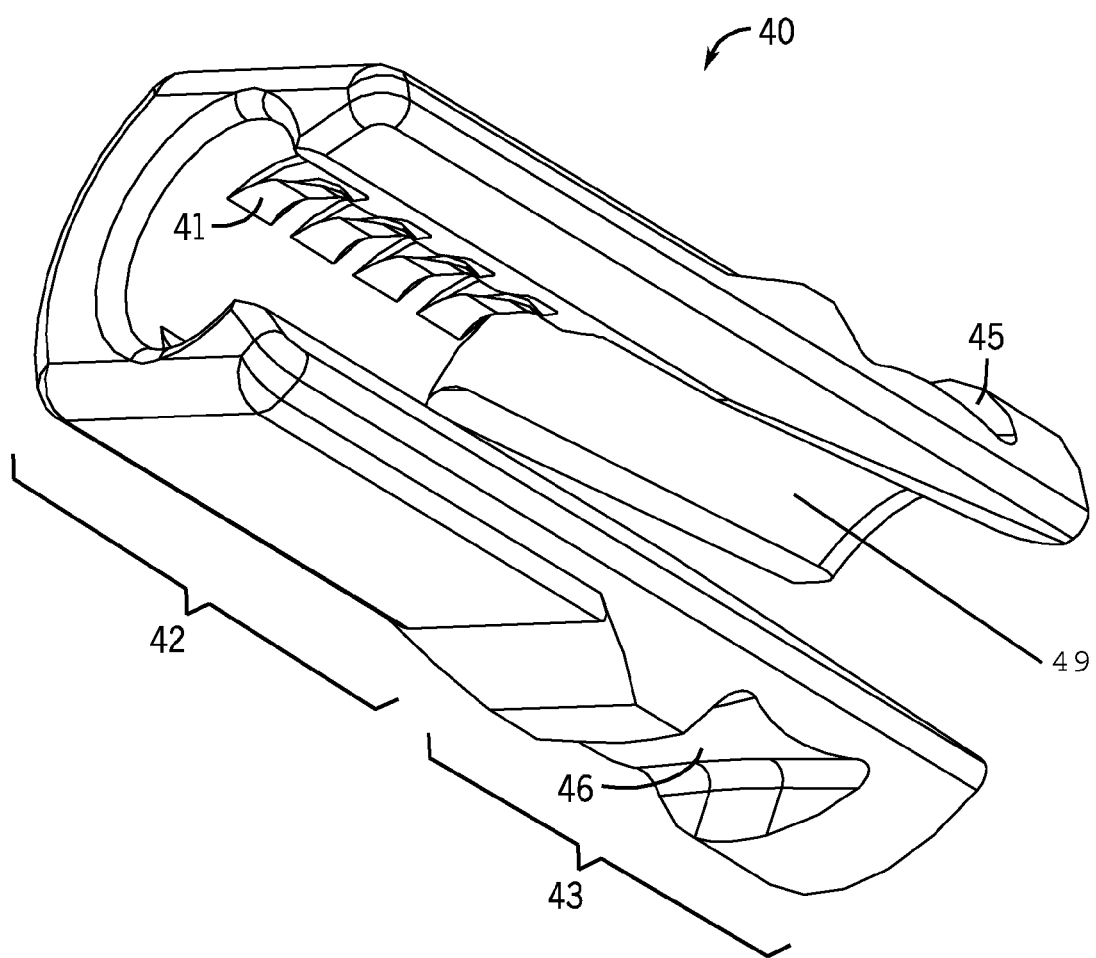
FIG. 11 is a side perspective view of a grommet in accordance with one embodiment of the present invention.
Figure 12:
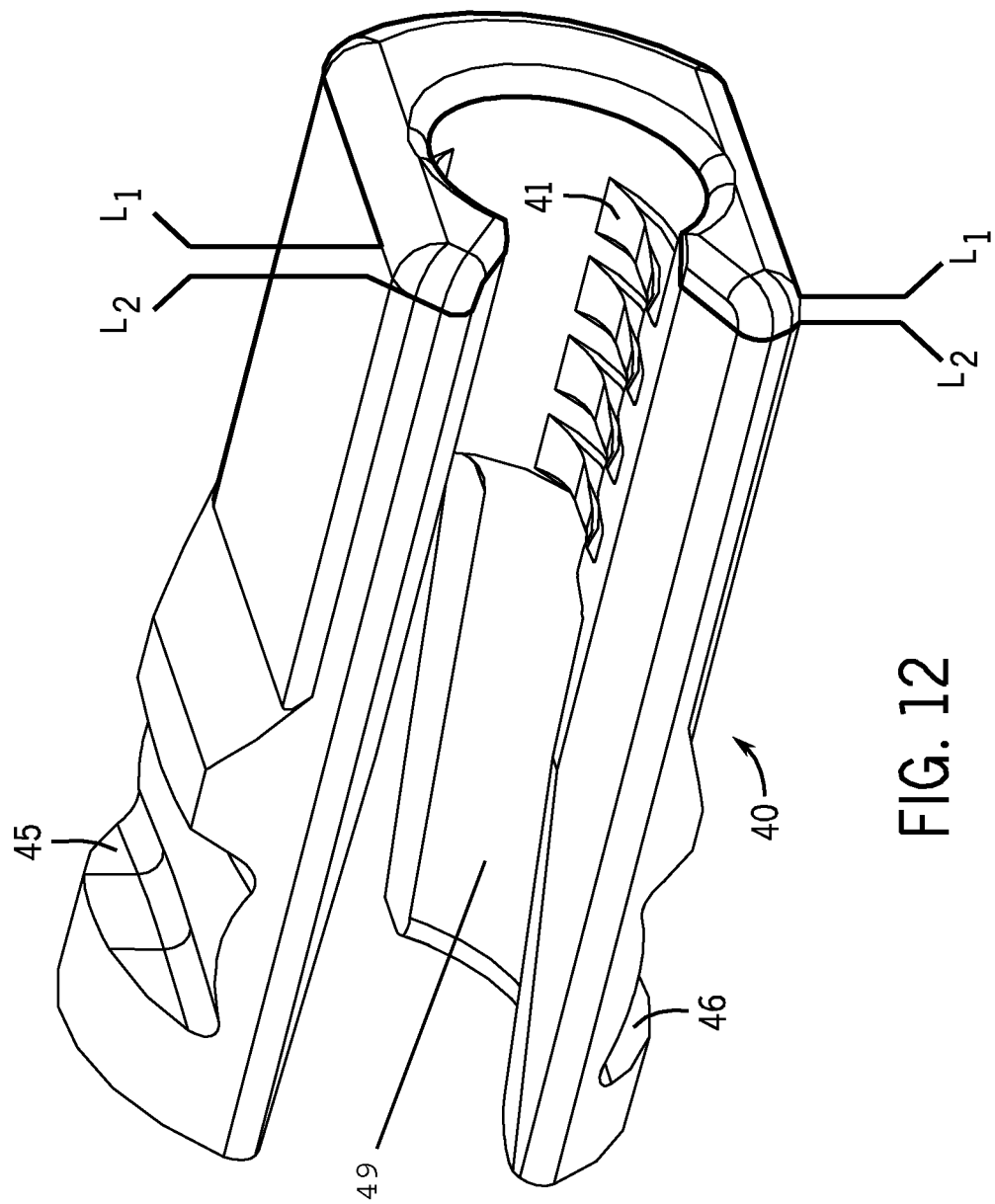
FIG. 12 is a side perspective view of a grommet in accordance with one embodiment of the present invention.

The adjuster 10 may also include a multi-function grommet 40. As seen in FIGS. 2-4 and 6-7, the grommet 40, which is C-shaped as seen in the preferred embodiment in the figures, is placed on the shaft 32 of the gear screw 30 and engages with the reflector 26. The threads 33 of gear screw 30 engage threads 41 on the inside of the grommet 40 (see FIGS. 11-13) to allow adjustment of the reflector 26. The grommet 40 is designed to allow the entire grommet 40 to pass through the hole 21 of the housing 20, and toward the reflector 26. As seen in FIGS. 11 and 12, the front end 42 of the grommet 40 may have a smaller diameter than the back end 43. The front end 42, which includes threads 41, fits tightly around the shaft 32 of the gear screw 30 for engagement with the gear screw 30. The back end 43 widens and provides a conical clearance to allow it to be compressed about the shaft 32 of the gear screw 30. The grommet 40 may be made of a plastic material or other suitable material by appropriate manufacturing methods such as molding or casting, and as seen in FIG. 12, and can be easily molded using only two cavities and cut along the lines $L_1$ and $L_2$ to form the C-shaped grommet 40.

Figure 10:
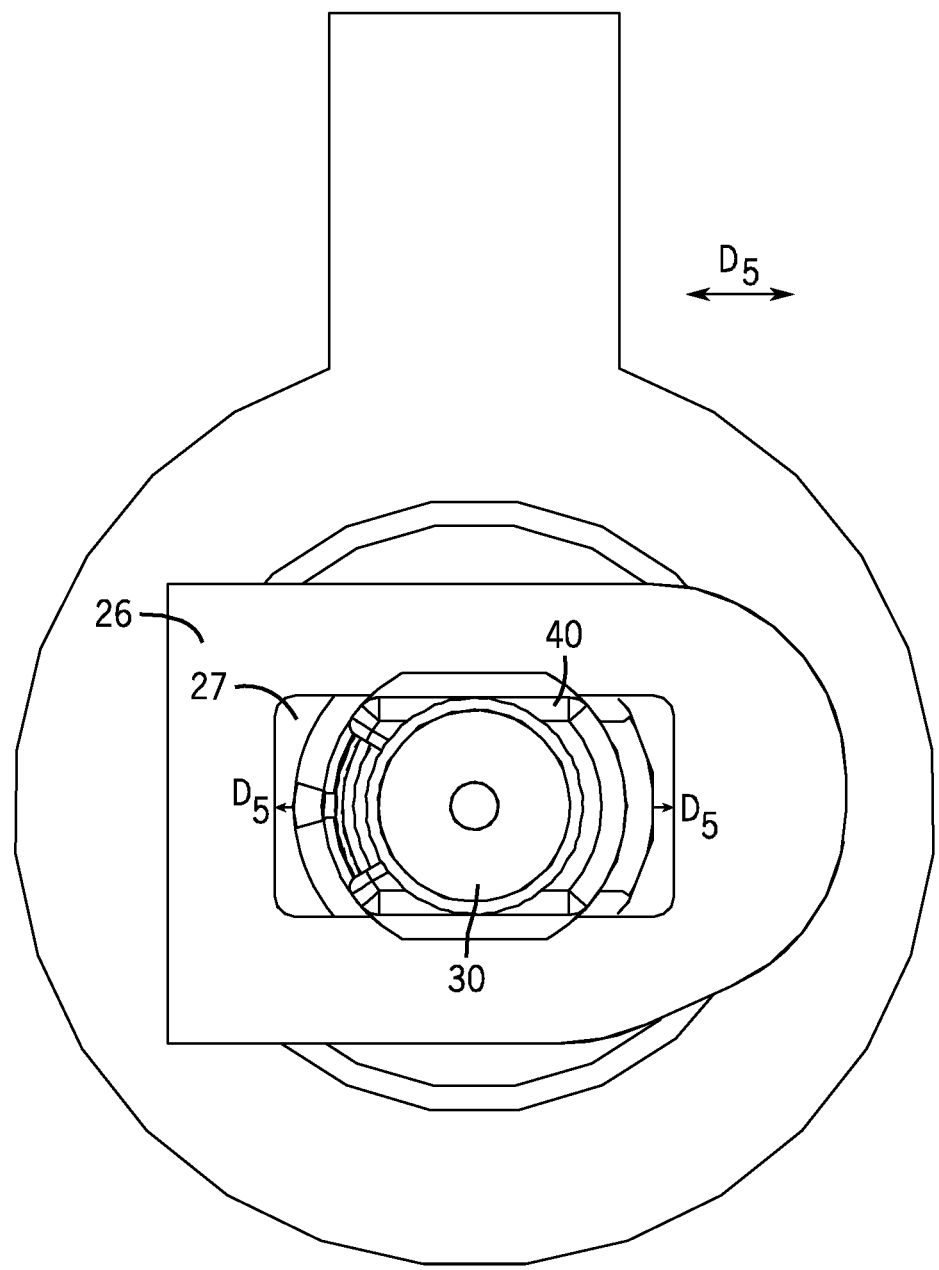
FIG. 10 is front elevational view of a gear screw adjuster installed into a headlamp assembly mounting and reflector in accordance with one embodiment of the present invention.

As seen in FIGS. 4 and 10, the headlamp reflector 26 may include a rectangular opening 27 through which the front end 42 of the grommet 40 passes. Upper 28 and lower 29 walls of the reflector 26 fit into channels 45, 46 located on opposite sides of the back end 43 of the grommet 40. The channels 45, 46 near the back end 43 of the grommet secure the grommet 40 to the reflector 26 through snap-fitting of the upper 28 and lower 29 walls of the reflector 26 into the channels 45, 46. The diameter of the grommet 40 allows the front end 42 to pass through the rectangular opening 27 of the reflector 26, and the opening 27 size compresses the back end 43 of the grommet 40. When reaching the channels 45, 46 the grommet 40 "pops" or snaps open so that the reflector 26 is securely snap-fit into the channels 45, 46 of the grommet 40.

The grommet 40 may facilitate movement of the reflector 26 in multiple directions, as seen in FIGS. 7-10. First, rotation of the gear screw 30 may facilitate forward movement of the reflector 26, indicated by arrow $D_1$. Additionally, the channels 45, 46 may allow the reflector 26 to pivot vertically, indicated by arrow $D_2$, and horizontally, indicated by arrow $D_3$. The middle area of the channels 45, 46 fit closely to the reflector 26 walls to prevent movement along the screw 30 axis (shown by the arrow $D_4$), but allow angular freedom for the vertical and horizontal pivoting motion of the reflector 26 due to the wider tops and bottoms of the channels 45, 46. Finally, as seen in FIG. 10, the opening 27 of the reflector 26 is rectangular in shape, and allows the C-shaped grommet 40 to move in a side-to-side direction within the space of the opening 27, as shown by the arrow $D_5$.

Figure 8:
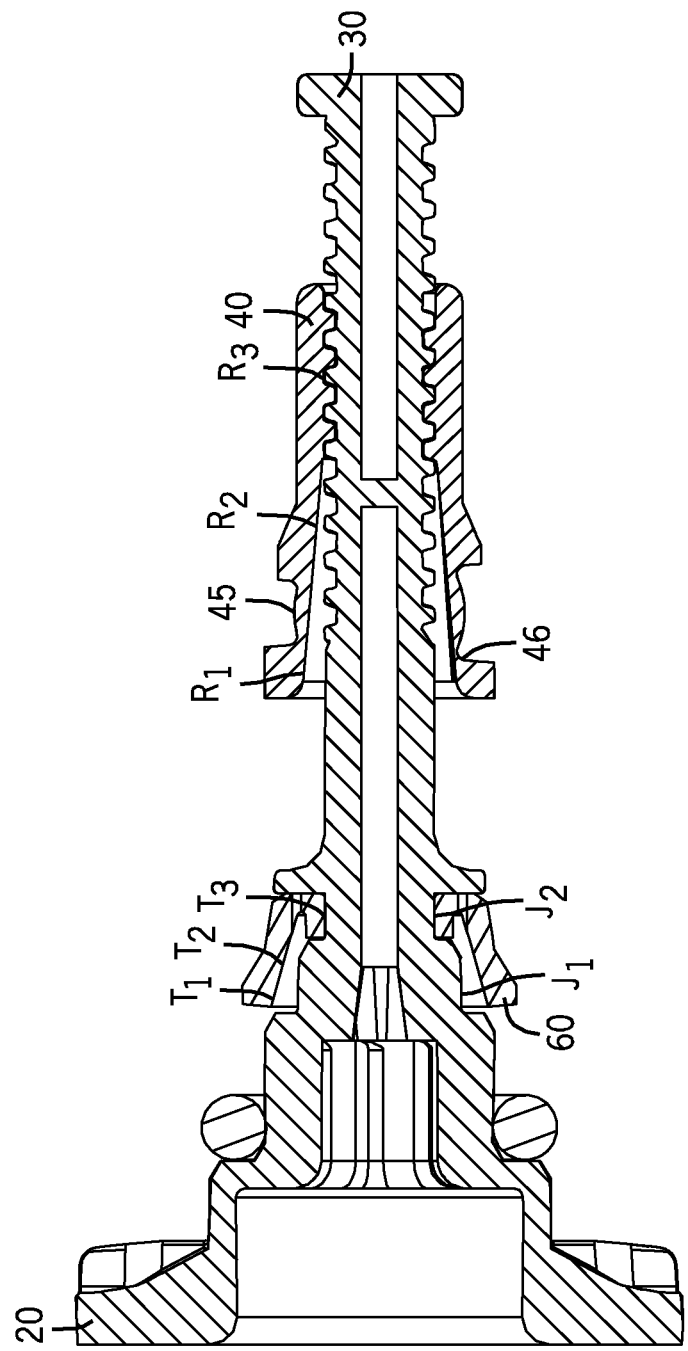
FIG. 8 is a cross-sectional view of a gear screw adjuster in accordance with one embodiment of the present invention shown without a headlamp assembly mounting and reflector.
Figure 9:
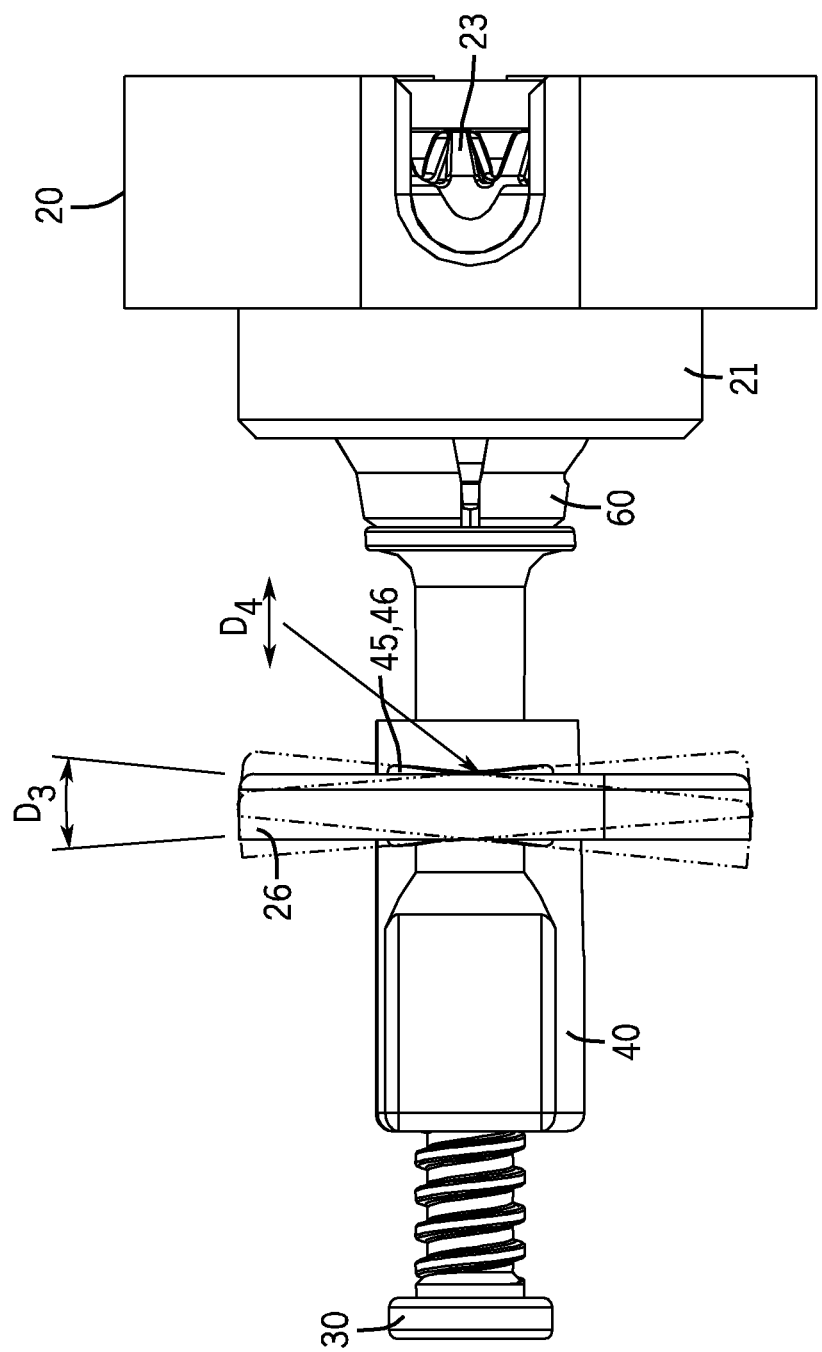
FIG. 9 is a top view of a gear screw adjuster installed into a headlamp assembly mounting and reflector in accordance with one embodiment of the present invention.

In FIG. 8, further details of the grommet 40, gear screw 30 and retainer clip 60 can be seen. $R_1$ is the area of the grommet 40 with the widest diameter where there is clearance between the grommet 40 and the gear screw 30; $R_2$ is the transition area between the wide diameter area $R_3$ and the small diameter area $R_1$; and $R_1$ indicates the small diameter area where the grommet 40 is in contact with the gear screw 30. Similarly, $T_1$ is the area of the retainer clip 60 with the widest diameter ($J_1$), where there is clearance between the retainer clip 60 and the gear screw 30; $T_2$ is the transition area between the wide area $T_1$ and the small diameter area $T_3$; and $T_3$ indicates the small diameter ($J_2$) area of the retainer clip 60 that hugs the gear screw 30.

The grommet 40 may also provide a clutching feature, whereby the gear screw 30 will "clutch," or disengage to stop forward movement, when a certain position is reached on the threads 33 of the gear screw 30 with respect to the grommet 40 to prevent over-travel and damage to the system. This prevents the gear screw 30 from extending or pulling past a desired distance; to re-engage, rotation need just be resumed in the opposite direction. As shown in FIG. 13, the flank angle A of the grommet threading 41 can be adjusted to affect the clutching force $F_T$. A change in this angle A affects the amount of force on the grommet 40 to cause flexion of the grommet 40 during clutching. If the angle A is adjusted so as to make the threads 41 more square in shape, clutching force $F_T$ can be increased without having to increase the wall thickness of the grommet 40. Alternatively, the more angled the threads 41, the greater $F_R$ is. The adjustments in angle A are important, as the amount of clutching force $F_T$ that is needed to adjust the reflector 26 without causing damage can be changed for a number of variables, such as the strength of the reflector material or desired length of travel.

As best seen in FIGS. 11 and 12, the inner portion of the grommet 40 may include threaded portions 41 and a smooth portion 49. The smooth portion 49 allows slipping without any lateral movement of the adjustment screw 30 or grommet 40. When the grommet 40 expands as the gear screw 30 is rotated, the smooth portion 49 allows the gear screw 30 to remain centered during rotation and allows the grommet 40 to expand evenly. Existing grommet designs do not include a smooth portion 49, and instead are generally fully threaded about the inside surface of the grommet 40, thus requiring movement of either the screw 30 or grommet 40 to effect slipping.

The snap-fitting features of the gear screw 30 into the headlamp housing 20 and the grommet 40 into the reflector 26 allows the pre-assembled adjuster 10 to be quickly and easily assembled into a headlamp assembly. The gear screw 30 with the accompanying O-ring 50, retaining clip 60 and grommet 40 is pushed through a hole 21 in the headlamp housing 20 (see FIG. 3). The components are sized such that the shaft 32 and grommet 40 pass through the hole 21, but the retaining clip 60 fits securely within the hole 21. The positioning of the components on the gear screw 30 allows the snap-fit of the retaining clip 60 on the gear screw 30 into the headlamp housing 20 to occur at roughly the same moment the grommet 40 reaches the correct position to snap-fit into the reflector 26. The pre-assembled adjuster 10 can therefore be easily, inexpensively, and quickly installed into the headlamp assemblies in one step with no assembly of the adjuster 10 or driving of the adjuster 10 into the headlamp components required by the installer.

Once the retaining clip 60 is snap fit into the housing 20 and the grommet 40 is snap fit into the reflector 26, the gear screw 30 is rotated, thereby translating movement to the grommet 40 so that the reflector 26 can be correctly positioned. The screw shaft 32 engages the complementary grommet threads 41, and the grommet 40 causes the reflector 26 to be translated into the proper position. Rotation of the gear screw 30 is accomplished by any number of conventional drive tools such as hexagonal, TORX® drive, or the like. The drive tool (not shown) is inserted into a recess in the head 34 of the gear screw 30 which, when rotated, causes rotation of the gear screw 30, movement of the grommet 40, and adjustment of the reflector 26 to the desired position. The shoulder 36 of the gear screw 30 fits within the housing collar 22.

Additional adjustment of the aim of the headlight is often required after the headlamp has been initially adjusted as previously described. Such adjustment is necessary after accidents involving front-end damage, major engine repair, or as a result of routine gyrations and wear and tear. The person doing such adjustment often cannot access the head 34 of the gear screw as described above. However, the person performing the additional adjustment may do so by inserting a driver 70 into the access shaft 23 of the housing 20 wherein the driver 70 engages the gear teeth portion 38 of the gear screw 30 (see FIGS. 2, 3, and 5), rotating the gear screw 30 to translate movement to the grommet 40 and position the reflector 26. In the embodiments shown in FIGS. 1, 4, and 5, the gear teeth 38 protrude in the forward direction. It is to be understood, however, that the gear teeth 38 may also protrude in the rearward direction. The driver 70 may be a flathead, Phillips head, TORX® head, hexagonal head driver, or the like, depending on the configuration used for the gear teeth 38.

Alternatively, a permanent driver input shaft (not shown) may be inserted into the access shaft 23. The head of the shaft may be configured to complement a driver. The gear engagement end (not shown) is configured to complement the gear teeth 38. Actuation of the driver 70 while the driver 70 is engaged, either directly or indirectly via the permanent driver input shaft, with the gear teeth 38 results in rotation of the gear screw 30, movement of the grommet 40, and movement of the reflector 36 into the correct position. Such rotation allows the person actuating the driver 70 to properly position the aim of the headlamp.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A gear screw adjuster assembly for use in a headlamp having a reflector, the adjuster assembly comprising:
   a gear screw having an integrally formed shoulder, an integrally formed neck, and an integrally formed threaded shaft;
   a retaining clip positioned at least partially around the gear screw, wherein the retaining clip is capable of compression as the gear screw is snap-fitted into the headlamp housing and is also capable of expansion so as to retain the gear screw in position in the headlamp housing;
   a flexible ring positioned around the gear screw;
   a snap-fit grommet positioned at least partially around the gear screw, the snap-fit grommet capable of compression as the gear screw is snap-fitted into the reflector and also capable of expansion so as to retain the gear screw in position in the reflector, and wherein the snap-fit grommet is operably engaged to the reflector such that rotation of the gear screw engages the snap-fit grommet and positions the reflector; and
   wherein the snap-fit grommet provides a clutching feature with respect to the gear screw to prevent over-travel of the gear screw.

2. The gear screw adjuster assembly of claim 1, wherein the snap-fit grommet comprises a threaded portion which engages with the threaded shaft of the gear screw.

3. The gear screw adjuster assembly of claim 2 wherein the snap-fit grommet comprises a nonthreaded portion.

4. The gear screw adjuster assembly of claim 1 wherein the rotation of the gear screw and engagement of the snap-fit grommet allows for positioning of the reflector in multiple directions.

* * * * *